(12) United States Patent
Komazawa et al.

(10) Patent No.: US 9,575,698 B2
(45) Date of Patent: Feb. 21, 2017

(54) PRINTER CONTROL DEVICE AND NON-TRANSITORY COMPUTER READABLE MEDIUM

(71) Applicant: FUJI XEROX CO., LTD., Tokyo (JP)

(72) Inventors: Hisao Komazawa, Kanagawa (JP);
Satoshi Yoshikawa, Kanagawa (JP);
Yoshinobu Nakamura, Kanagawa (JP);
Kimihiko Isobe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/606,054

(22) Filed: Jan. 27, 2015

(65) Prior Publication Data

US 2016/0070998 A1 Mar. 10, 2016

(30) Foreign Application Priority Data

Sep. 4, 2014 (JP) ................................ 2014-180059

(51) Int. Cl.
*G06F 3/12* (2006.01)

(52) U.S. Cl.
CPC ........... *G06F 3/1285* (2013.01); *G06F 3/1206* (2013.01); *G06F 3/1247* (2013.01)

(58) Field of Classification Search
USPC .............. 358/1.15, 1.18, 2.1, 486, 406, 1.14
See application file for complete search history.

(56) References Cited

U.S. PATENT DOCUMENTS

| | | | | |
|---|---|---|---|---|
| 8,854,669 B1* | 10/2014 | Jazayeri | ................ | G06F 3/1204 358/1.15 |
| 2005/0128514 A1* | 6/2005 | Wanda | ................... | G06F 3/121 358/1.15 |
| 2005/0174379 A1* | 8/2005 | Nakazawa | ................. | B41J 3/60 347/19 |
| 2007/0177198 A1* | 8/2007 | Miyata | .................. | G06F 3/1204 358/1.15 |
| 2007/0279673 A1* | 12/2007 | Utsunomiya | .......... | G03G 15/55 358/1.14 |
| 2010/0122633 A1* | 5/2010 | Doyle | ................ | H05K 13/0061 101/126 |
| 2012/0163853 A1* | 6/2012 | Ikeda | ................. | G03G 15/5062 399/82 |
| 2014/0071495 A1* | 3/2014 | Asada | ................... | G06F 3/1208 358/1.18 |
| 2014/0092422 A1* | 4/2014 | Shima | .................. | G06F 3/1204 358/1.14 |

FOREIGN PATENT DOCUMENTS

JP        10-226138        8/1998

OTHER PUBLICATIONS

Abstract and machine translation of JP 10-226138, Aug. 1998.

* cited by examiner

*Primary Examiner* — Jerome Grant, II
(74) *Attorney, Agent, or Firm* — Fildes & Outland, P.C.

(57) ABSTRACT

A printer control device uses a rasterized data generation unit that generates rasterized data for a first printer, and a setting information obtainment unit that obtains setting information related to drawing of a mark image for a second printer in the generated rasterized data, so that a mark drawing unit draws the mark image for the second printer in the generated rasterized data on the basis of the setting information, and a printing control unit allows the second printer to perform a printing process using the rasterized data generated for the first printer in which the mark image for the second printer is drawn.

9 Claims, 11 Drawing Sheets

FIG. 9

OVERWRITING SETTING FOR MARK IMAGE

MARK DRAWING STYLE

MARK TYPE: COLOR REGISTER MARK ▶

CONDITION: [1] DOT(S) OR MORE

SEARCH RANGE: UP: [0] DOWN: [0] RIGHT: [0] LEFT: [0]

DRAWING METHOD: DISPLACE AND DRAW ▶ DIRECTION OF DISPLACEMENT: RIGHT ▶

ADD

EDIT
DELETE
MOVE UP
MOVE DOWN

OK      CANCEL

☐ START PRINTING OF JOB AFTER ALL PAGES ARE VERIFIED PRELIMINARILY

FIG. 11

PRELIMINARY VERIFICATION

JOB NUMBER : 329

JOB COMMENT: MANAGEMENT_No299834_Y_CORPORATION
_SALES_PAMPHLET_20140309

ON PAGE [27], [REGISTER MARK] CONDITION IS MATCHED.
[PRINTING STOPPAGE] IS PERFORMED.
ON PAGE [27], [VERIFICATION CODE] CONDITION IS MATCHED.
[PRINTING STOPPAGE] IS PERFORMED.
ON PAGE [29], [COLOR REGISTER MARK] CONDITION IS MATCHED.
[DISPLACE AND DRAW] IS PERFORMED.

OK

PRINTER CONTROL DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-180059 filed on Sep. 4, 2014.

BACKGROUND

Technical Field

The present invention relates to a printer control device and a non-transitory computer readable medium.

SUMMARY

An aspect of the present invention provides a printer control device including: a rasterized data generation unit that generates rasterized data for a first printer; a setting information obtainment unit that obtains setting information that is related to drawing of a mark image for a second printer in the generated rasterized data; and a mark drawing unit that draws the mark image for the second printer in the generated rasterized data on the basis of the setting information.

BRIEF DESCRIPTION OF DRAWINGS

Exemplary embodiment(s) of the present invention will be described in detail based on the following figures, wherein

FIG. 9 is a diagram illustrating an example of UI image information,

FIG. 11 is a diagram illustrating, an example of a preliminary verification screen;

DETAILED DESCRIPTION

Figure 1:
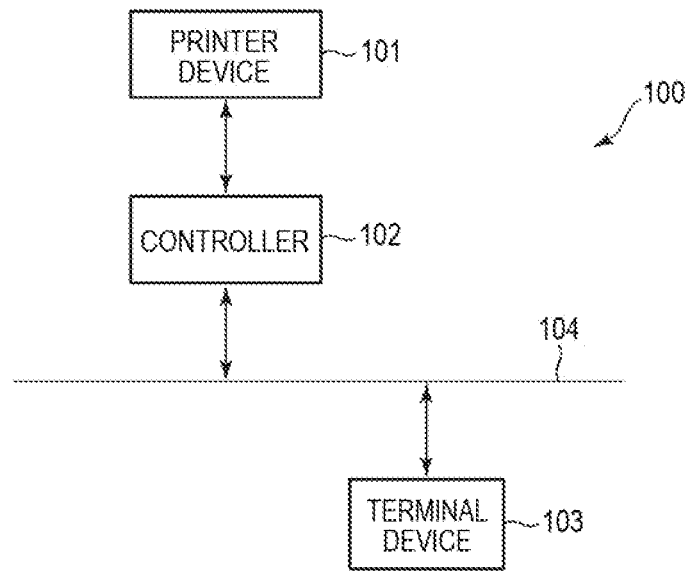
FIG. 1 is a diagram illustrating an example of the outline configuration of a printer system.

Hereinafter, embodiments of the present invention will be described with reference to the drawings. The same or equivalent constituent is given the same reference sign in the drawings, and repeated description thereof is omitted.

FIG. 1 is a diagram for describing the outline configuration of a printer system in an embodiment of the present invention. A primer system 100 includes a printer device 101, a controller 102, and a terminal device 103. The terminal device 101 generates job data and transmits the job data to the controller 102 through a network 104. The controller 102 controls a printing process by the printer device 101 on the basis of the job data transmitted from the terminal device 103. The printer device 101 performs the printing process according to a control signal from the controller 102.

Figure 2:
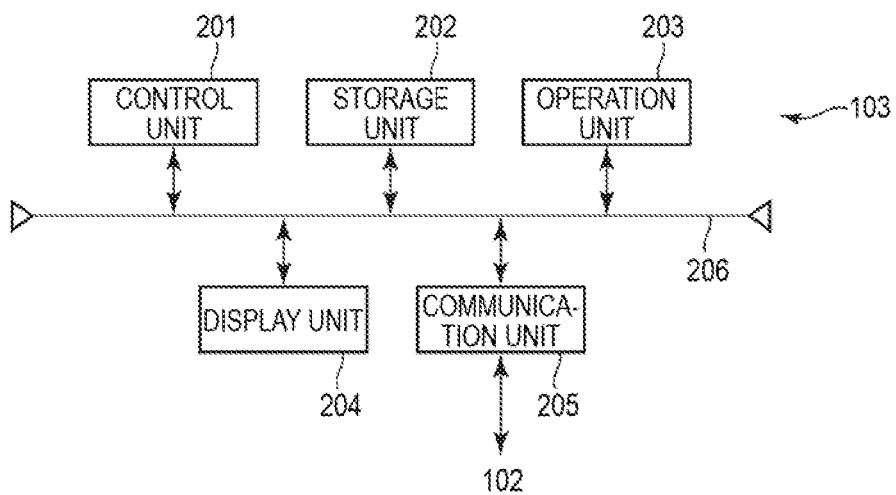
FIG. 2 is a diagram illustrating an example of the outline configuration of a terminal device.

FIG. 2 is a diagram for describing the outline configuration of a terminal device. As illustrated in FIG. 2, the terminal device 103 includes a control unit 201, a storage unit 202, an operation unit 203, as display unit 204, and a communication unit 205. The units 201 to 205 are connected to each other by an internal bus 206. The control unit 201, for example, is a CPU and operates according to a program stored in the storage unit 202. The storage unit 202, for example, is configured by an information recording medium such as a ROM, a RAM, a hard disk, and the like and is an information recording medium that holds a program executed by the control unit 201. The storage unit 202 also operates as a work memory for the control unit 201.

The program, for example, may be provided by downloading through a network or may be provided by various information recording media such as a CD-ROM, a DVD-ROM, and the like that can be read by a computer.

The operation unit 203, for example, is configured by an interface such as a keyboard and the like and outputs the contents of an instruction operation to the control unit 201 in response to the instruction operation of a user. The display unit 204, for example, is a liquid crystal display an organic EL display, or the like and displays information according to an instruction from the control unit 201. The communication unit 205 is connected to the controller 102.

Figure 3:
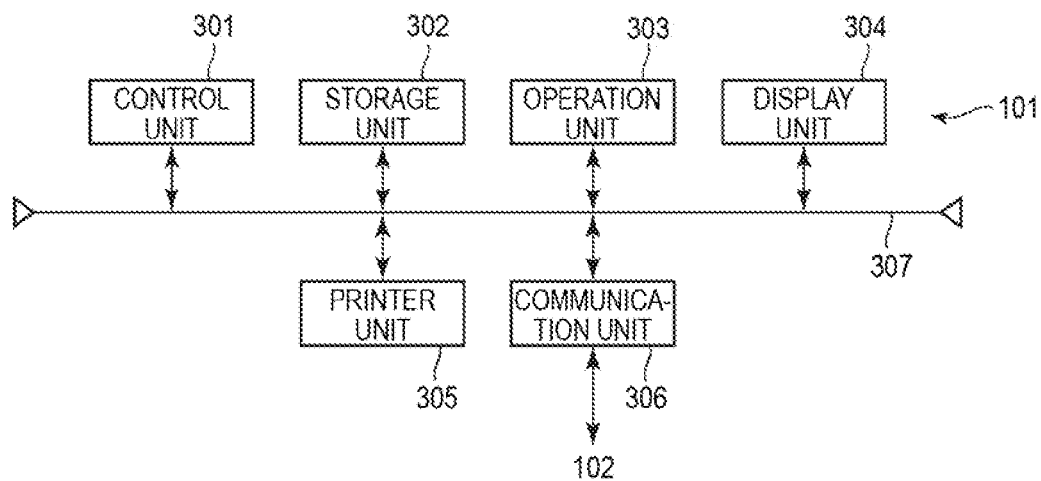
FIG. 3 is a diagram illustrating an example of the outline configuration of a printer device.

FIG. 3 is a diagram for describing the outline configuration of a printer device. As illustrated in FIG. 3, the printer device 101 includes a control unit 301, a storage unit 302, an operation unit 303, a display unit 304, a printer unit 305, and a communication unit 306. The units 301 to 306 are connected to each other by an internal bus 307.

The operation unit 303, for example, is configured by an interface such as plural button touch panel, described further below, displayed in the display unit 304, and the like, and outputs the contents of an instruction operation to the control unit 301 in response to the instruction operation of a user. The display unit 304, for example, is a liquid crystal display, an organic EL display, or the like and displays information according to an instruction from the control unit 301.

The printer unit 305, for example, prints an image obtained by the controller 102 according to the control signal from the controller 102. The communication unit 306 connects the printer device 101 to the controller 102. Since the configuration of the control unit 301, the storage unit 302, and the like is the same as that of the control unit 201, the storage unit 202, and the like, description thereof is omitted.

Figure 4:
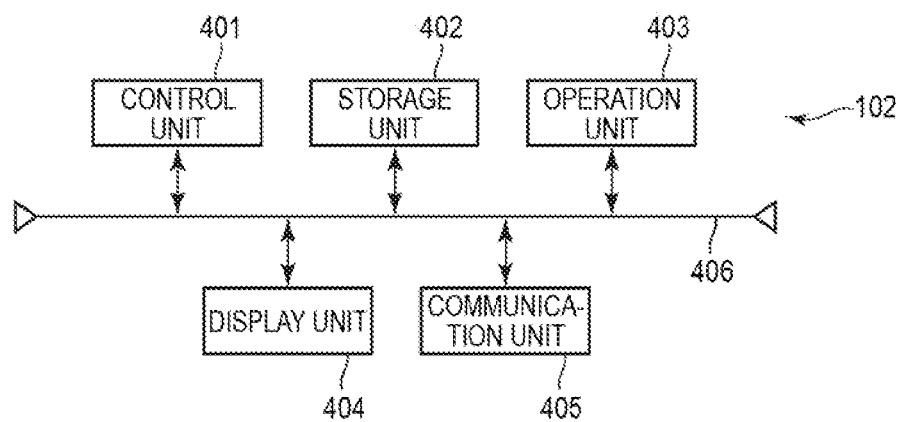
FIG. 4 is a diagram illustrating an example of the outline configuration of a controller.

FIG. 4 is a diagram for describing the outline configuration of a controller. As illustrated in FIG. 4, the controller 102, for example, includes a control unit 401, a storage unit 402, an operation unit 403, a display unit 404, and a communication unit 405. The units 401 to 405 are connected to each other by an internal bus 406. Since the configuration of each of the units 401 to 405 is the same as that of the control unit 301, the storage unit 302, the operation unit 303, the display unit 304, and the communication unit 306, description thereof is omitted. In addition, the configuration of the printer device 101, the terminal device 103, and the controller 102 illustrated in FIGS. 2 to 4 serves as an example, and the present embodiment is not limited to the above configuration.

Figure 5:
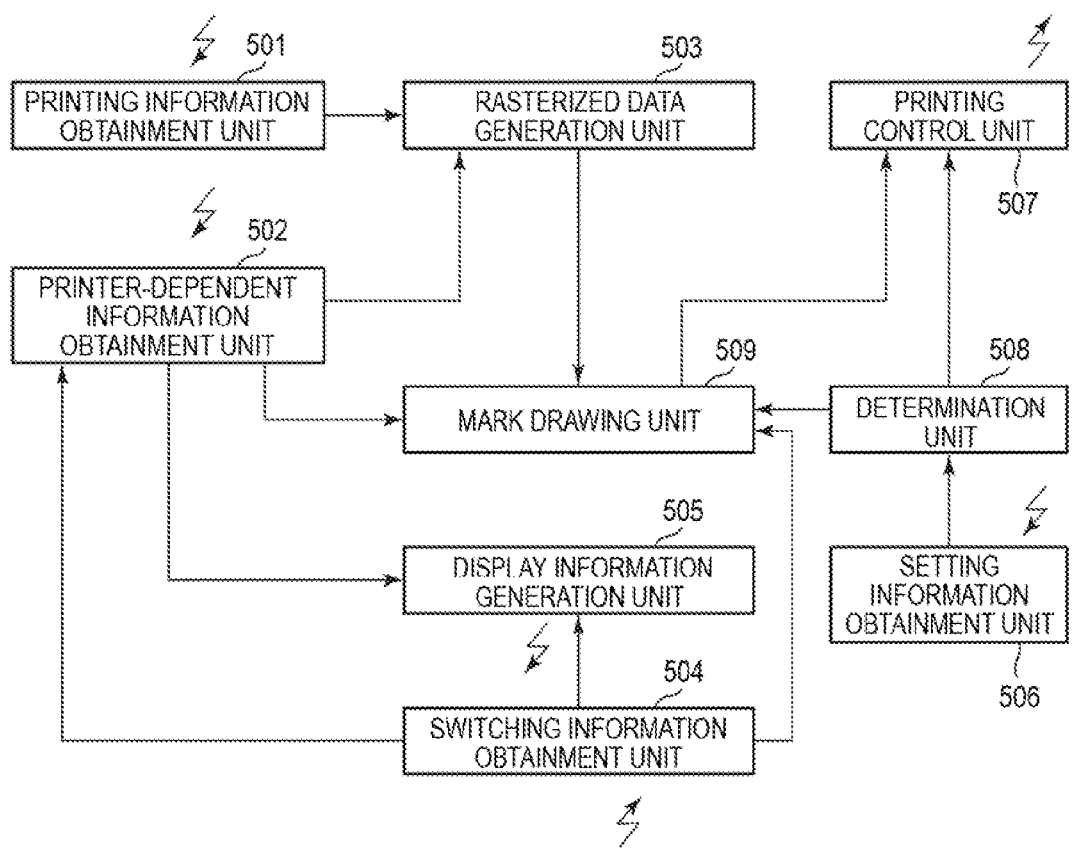
FIG. 5 is a diagram illustrating an example of the functional outline configuration of the controller.

FIG. 5 is a diagram for describing an example of the functional outline configuration of the controller in the present embodiment. As illustrated in FIG. 5, the controller (printing control device) 102 functionally includes a printing information obtainment unit 501, a printer-dependent information obtainment unit 502, a rasterized data generation unit 503, a switching information obtainment unit 504, a display information generation unit 505, a setting information obtainment unit 506, a printing control unit 507, a determination unit 508, and a mark drawing unit 509.

For easy understanding, a case where a second printer (for example, a cut paper printer or a continuous paper printer) is switched from a first printer and is used with connection to the controller 102 when the first printer (for example, a continuous paper printer or a cut paper printer) connected to the controller 102 (for example, a digital front-end (DFE)) fails to function will be mainly described below. Here, a continuous paper printer is a printer that uses a continuous paper as a printing medium, and a cut paper printer is a printer that uses a cut paper as a printing medium. The first printer and the second printer correspond to the printer device 101.

Figure 6:
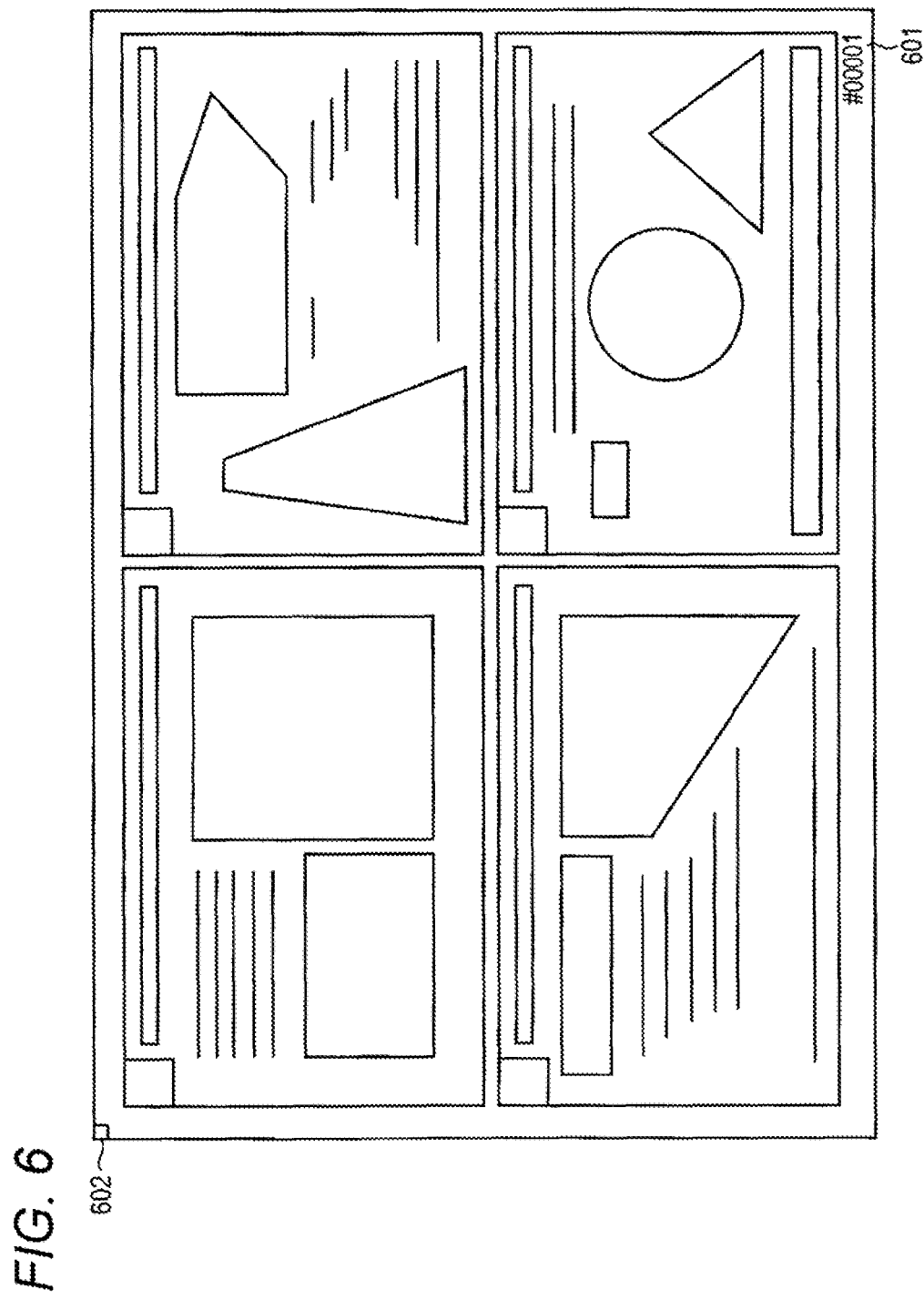
FIG. 6 is a diagram illustrating an example of printing information.

The printing information obtainment unit 501 obtains printing information from the terminal device 103 for printing by the first printer. The printing information, for example, is data (for example, PDF data or the like) that includes a printing target such as a character, a figure, an image, and the like and is transmitted by a user from the terminal device 103 as job data. As illustrated in FIG. 6, depending on user operation, the data may include a printer-specific mark image for control (a management ID and a mark for post-process control) as the job data printed by the printer. The mark image will be described further below. In FIG. 6, the management ID is illustrated as 601, and the mark for post-process control is illustrated as 602.

Figure 7:
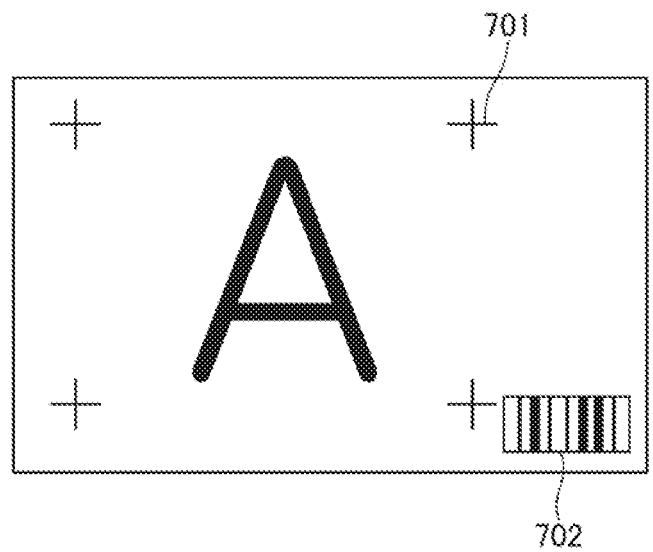
FIG. 7 is a diagram illustrating an example of a mark image.
Figure 8:
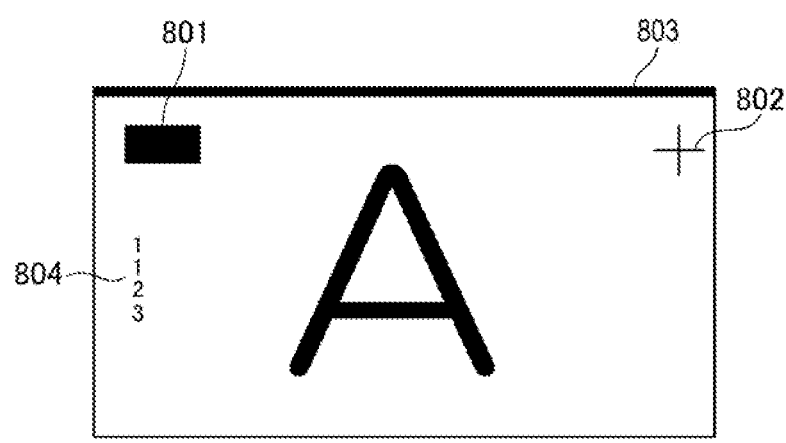
FIG. 8 is a diagram illustrating another example of the mark image.

The printer-dependent information obtainment unit 502 obtains printer-dependent information of the first printer from the first printer. The printer-dependent information, for example, includes information that is necessary for printing the mark image when the first printer is used. Specifically, the mark image, for example, corresponds to a mark 701 for a post-processor for as cut paper in a cut paper printer and a management barcode 702 as illustrated in FIG. 7 and corresponds to a register mark 801 for aligning both sides of a continuous paper when priming is performed by a continuous paper printer, a color register mark 802 for color alignment, as mark 803 for ejection by a nozzle, a verification code 804, and the like as illustrated in FIG. 8. The above mark images serve as an example, and the mark image in the present embodiment is not limited to the above mark images. The printer-dependent information obtainment unit 502 further obtains second printer-dependent information from the second printer when the switching information obtainment unit 504 obtains switching information as described further below.

The rasterized data generation unit 503 generates rasterized data on the basis of the printing information. The rasterized data is configured not to include the mark image that is based on the primer-dependent information of the first printer. The rasterized data corresponds to raster print data.

The switching information obtainment unit 504 obtains switching information when the first printer fails to function, and the second printer is connected to the controller 102. The switching information here, for example, corresponds to information that indicates whether or not a printer is switched. More specifically, for example, the switching information is configured to be obtained by the controller 102 when the first printer fails to function, and a user switches the first printer to the second printer. Obtaining the switching information is not limited to the above manner. For example, a user may input the switching information.

The display information generation unit 505 generates UI image information for setting setting information that is described further below. The UI image information, for example, is displayed in the display unit 204 of the terminal device 103 of a user, and a user inputs the setting information, using the UT image information. Then, the setting information obtainment unit 506 obtains the setting information.

The setting information, for example, corresponds to information that indicates whether to print the mark image forcibly, to displace and print the mark image, not to print the mark image, to stop printing, or the like when an area (printing area) where the mark image based on the second printer-dependent information is expected to be printed and an area where printing data in the rasterized data exists overlap with each other. More specifically, for example, the setting information obtainment unit obtains the setting information in a manner in which the UI image information illustrated in FIG. 9 is displayed in the display unit 204 of the terminal device 103 of a user, and a user, for each mark image, sets a condition the number of overlapping dots or the search range of the overlap), a printing method for is case where a condition is matched (overwrite the overlap and print, displace and print, or stop printing), and a direction of displacement for a case of displacing and printing (left, right, up, down, or the like). Hereinafter, a condition for a case of overwriting, is called an overwritten printing condition, a condition for a case of displacing and printing is called a displaced printing condition, and a condition for a case of stopping printing is called a printing stoppage condition. Regarding the printing method, other printing methods such as a case of not printing and the like may be further included. The area where the printing data exists, for example, corresponds to an area where a gradation value of the rasterized data is greater than or equal to a threshold that is set in advance or such an area.

Furthermore, as illustrated in FIG. 9, a condition that is set may be configured to be displayed as a list, and a condition that is preferentially applied may be configured to be displayed when plural conditions is matched. Furthermore, other configurations may also be available. When the printing stoppage condition is matched at the start of printing of a job, the job may not be started before the start of printing, or the condition may be checked while the job is printed. When the printing stoppage condition is matched during printing, the job may be stopped, and a user may be urged to change the condition. When the condition is changed to another one that does not match the printing stoppage, printing may be resumed.

The printing control unit 507 stops printing when the printing stoppage condition is determined to be matched. The printing control unit 507 transfers the rasterized data in which the mark is drawn by the mark drawing unit 509 as described further below to the second printer and allows the second primer to perform the printing process.

The determination unit 508 determines whether or not each condition is matched. When the determination unit 508 determines that the overwritten printing condition is matched, the mark drawing unit 509 draws the mark image on the basis of the second printer-dependent information and generates the rasterized data in which the mark image is drawn.

When the determination unit 508 determines that the displaced printing condition is matched, the mark drawing unit 509 draws the mark on the basis of the setting information. Specifically, for example, the mark is drawn, displaced in the direction by one dot at a time to a position where the condition is not matched. When the position of the drawing does not exist in the range of a paper, printing may be configured to be stopped.

Figure 10A:
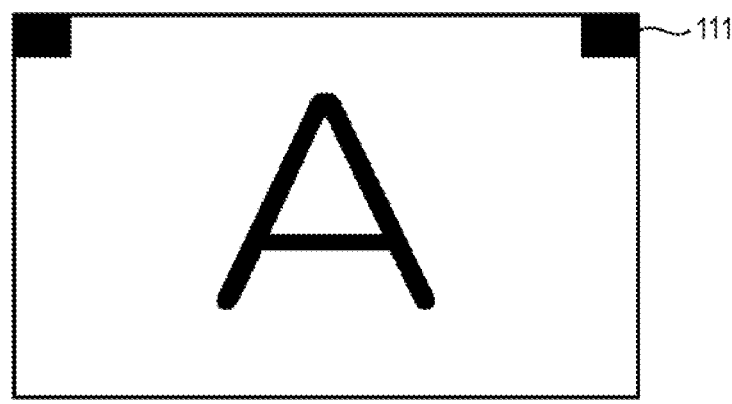
FIG. 10A is a diagram for describing drawing of the mark image.
Figure 10B:
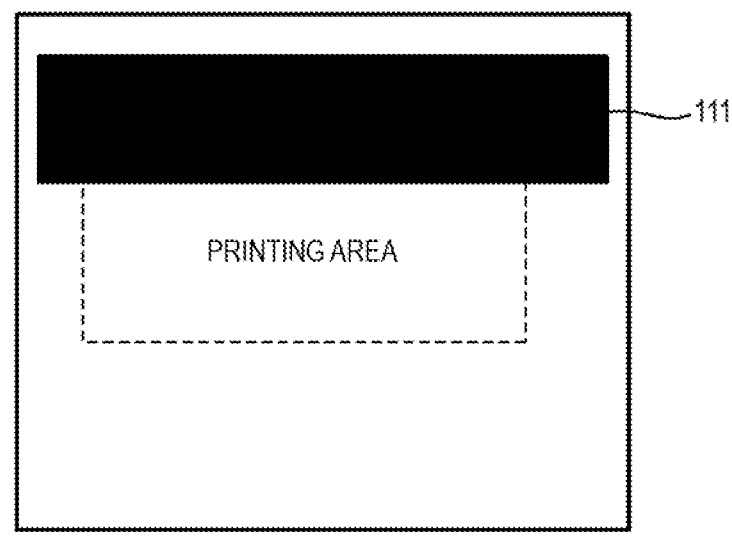
FIG. 10B is a diagram for describing drawing of the mark image.
Figure 10C:
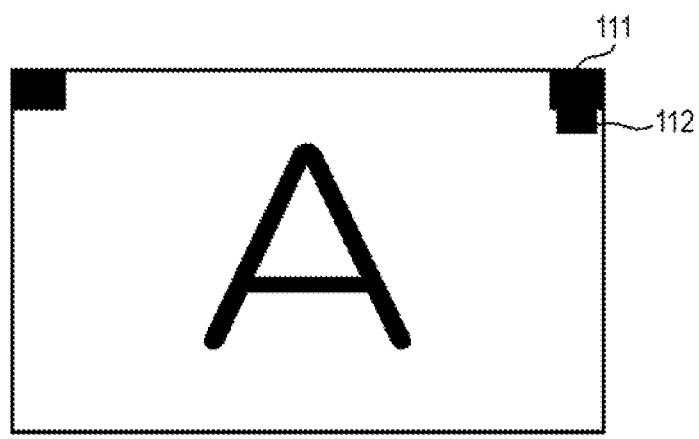
FIG. 10C is a diagram for describing drawing of the mark image.
Figure 10D:
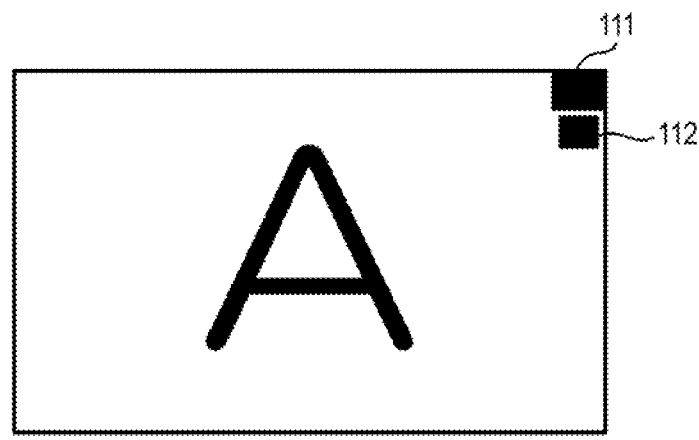
FIG. 10D is a diagram for describing drawing of the mark image.

Specific description will be made by using FIGS. 10A to 10D. For example, a mark image 111 (corresponds to the area where the printing data exists) is previously inserted into original PDF data as illustrated in FIG. 10A. In this case, the position of a mark image 112 based on the second printer-dependent information overlaps with the mark image 111 as illustrated in FIG. 10B. Here, FIG. 10B corresponds to a diagram in which a part of the vicinity of the mark image 111 in FIG. 10A is enlarged. In this case, when the overwritten printing condition is matched, the mark image 112 is forcibly drawn even when overlapping with the mark image 111 as illustrated in FIG. 10C. Such a mark image that is overwritten and is printed, for example, is a register mark or the like. When the displaced printing condition is matched, the mark image 112 is drawn, displaced by a predetermined distance from the mark image 111 as illustrated in FIG. 10D. Such a mark image that is displaced and is printed, for example, is a color register mark or the like.

Figure 12:
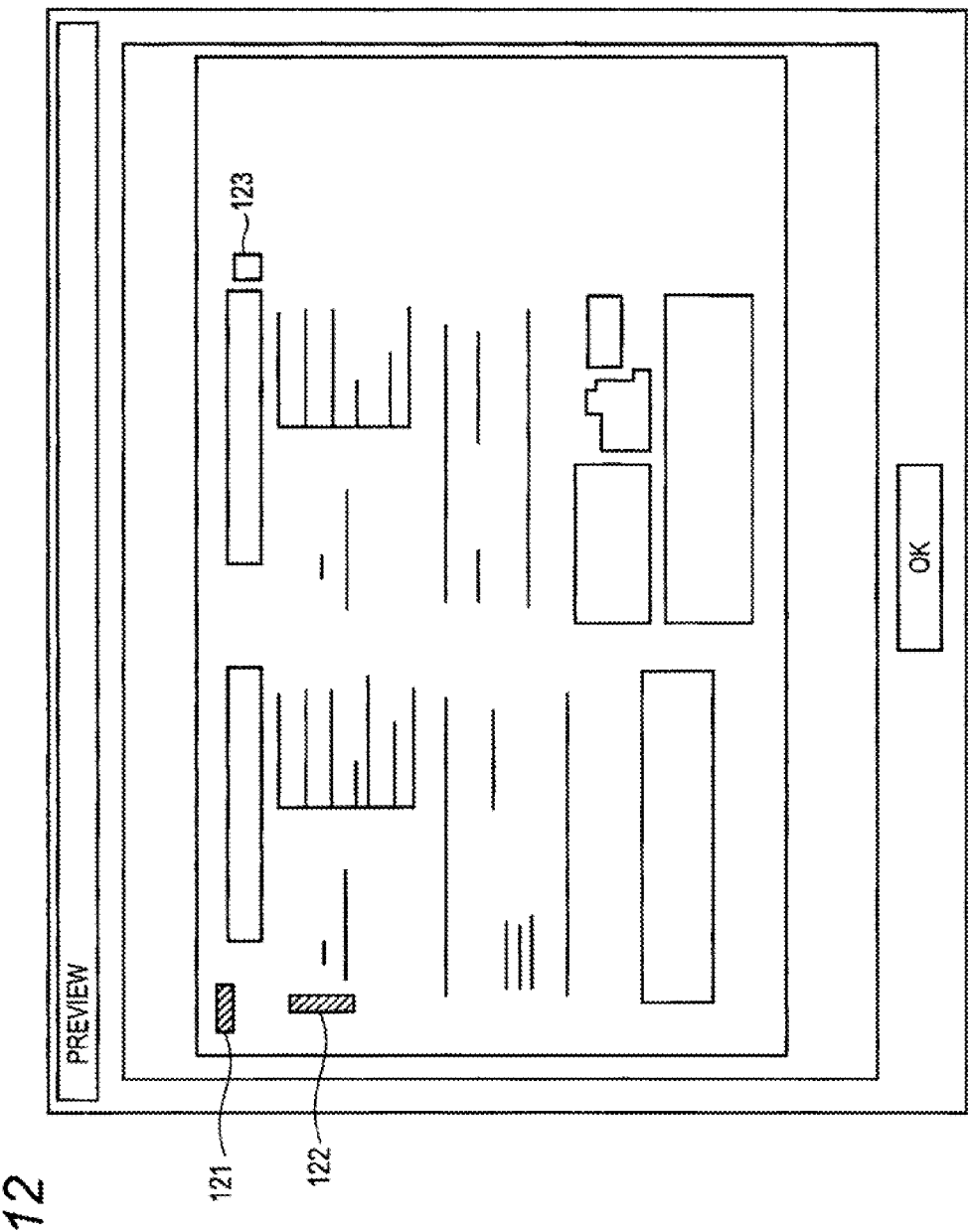
FIG. 12 is a diagram illustrating an example of the preliminary verification screen for page one.

In the present embodiment, as illustrated in FIG. 11, a verification screen may be configured to be displayed to indicate a drawing method for each mark image (displaced drawing or the like) and/or whether or not each condition is matched. In addition, each mark image that corresponds to a condition and each mark image that does not correspond to the condition may be configured to be displayed identifiably as illustrated in FIG. 12. Specifically, for example, a mark image 121 and a mark image 122 are displayed in a first color as corresponding to the condition, and a mark image 123 is displayed in a second color as not corresponding to the condition.

In a normal case, that is, when the first printer does not fail to function, and printing is performed by the first printer, the switching information obtainment unit 504 does not obtain the switching information. In this case, the mark drawing unit 509 draws the mark image in the rasterized data on the basis of the first printer-dependent information. Then, the printing control unit 507 transfers the rasterized data in which the mark is drawn to the first printer and allows the first printer to perform the printing process.

Figure 13:
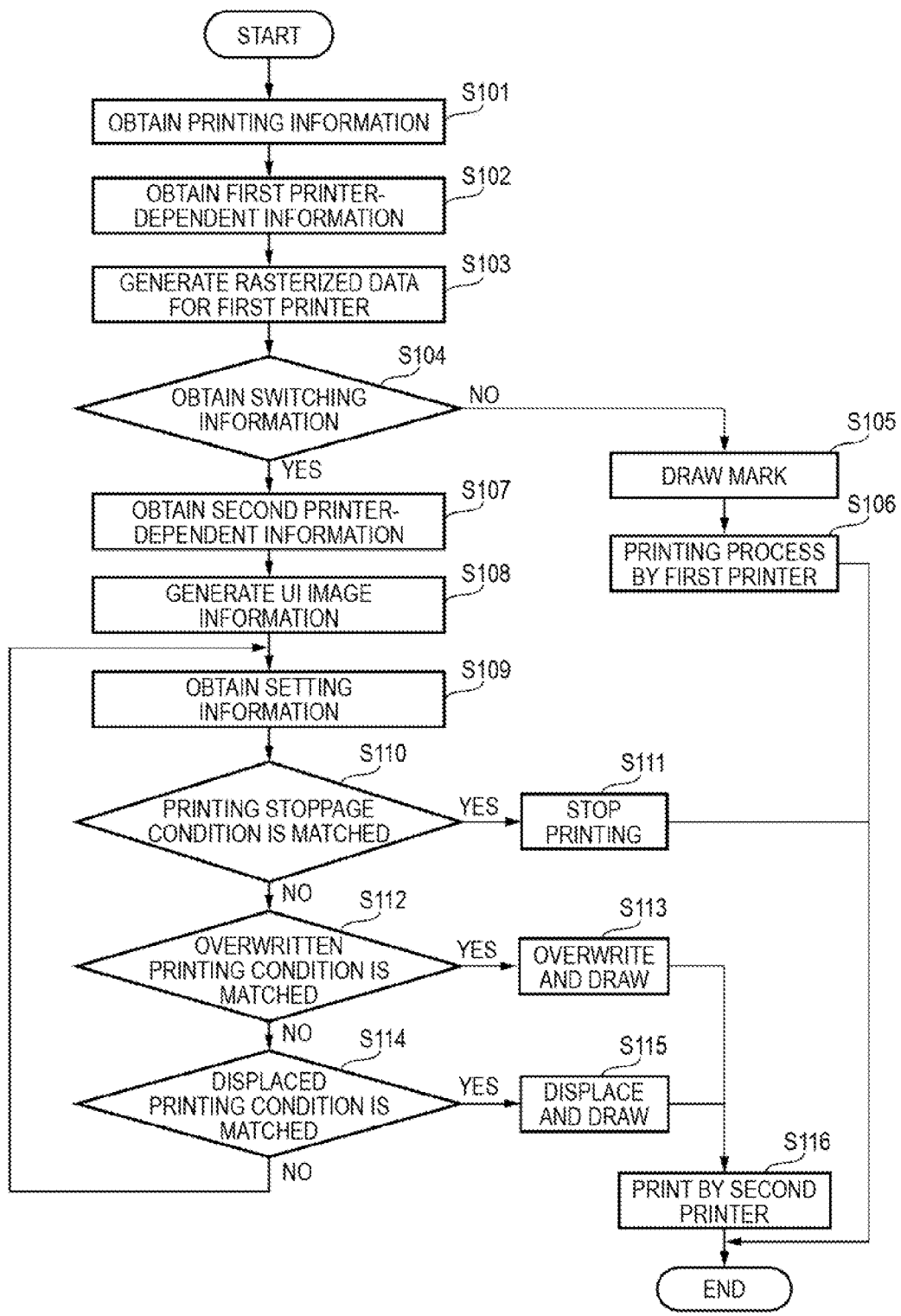
FIG. 13 is a diagram illustrating an example of the flow of as process by the controller.

FIG. 13 is a diagram for describing the flow of a process by the controller 102 in the present embodiment.

As illustrated in FIG. 13, the printing information obtainment unit 501 of the controller 102 obtains the printing information from the terminal device 103 for printing by the first printer (S101). The printer-dependent information obtainment unit 502 obtains the first printer-dependent information from the first printer (S102). The rasterized data generation unit 503 generates the rasterized data on the basis of the printing information and the first printer-dependent information (S103).

The switching information obtainment unit 504 determines whether or not the switching information is obtained (S104). When the switching information obtainment unit 504 determines that the switching information is not obtained, the mark drawing unit 509 draws the mark in the rasterized data on the basis of the first printer-dependent information (S105). The printing control unit 507 transfers the rasterized data in which the mark is drawn to the first printer and allows the first printer to perform the printing process (S106). Then, the process is ended.

Meanwhile, when the switching information obtainment unit 504 determines that the switching information is obtained S104, the printer-dependent information obtainment unit 502 obtains the second printer-dependent information from the second printer (S107). The display information generation unit 505 generates the UI image information for setting the setting information (S108). The setting information obtainment unit 506 obtains the setting information (S109).

The determination unit 508 determines whether or not the printing stoppage condition is matched on the basis of the rasterized data generated in S103 and the setting information (S110). When the printing stoppage condition is determined to be matched, the printing control unit 507 stops printing (S111).

Meanwhile, when the determination unit 508 determines that the printing stoppage condition is not matched, the process proceeds to S112. The determination unit 508 determines whether or not the overwritten printing condition is matched (S112).

When the determination unit 508 determines that the overwritten printing condition is matched, the mark drawing unit 509 draws the mark on the basis of the second printer-dependent information (S113). Then, the process proceeds to S116.

Meanwhile, when the determination unit 508 determines that the overwritten printing condition is not matched, the process proceeds to S114. The determination unit 508 determines whether or not the displaced printing condition is matched (S114).

When the determination unit 508 determines that the displaced printing condition is matched, the mark drawing unit 509 draws the mark on the basis of the setting information (S115). Then, the process proceeds to S116.

The printing control unit 507 transfers the rasterized data in which the mark is drawn in S113 or S115 to the second printer and allows the second printer to perform the printing process (S116). Then, the process is ended.

Meanwhile, when the determination unit 508 determines that the displaced printing condition is not matched in S114, the process returns to S109. In this case, for example, a user is urged to change the setting information, and determination or the like of each condition above is performed on the basis of the changed setting information.

The flow of the process is described regarding one mark image above. However, it is needless to say that the process of determining whether or not each condition in S110, S112, S114, and the like is matched or such a process is performed for each mark image when plural mark images is included.

The foregoing description of the exemplary embodiments of the present invention has been provided for the purposes of illustration and description. For example each condition such as the printing stoppage condition, the overwritten printing condition, the displaced printing condition, and the like is set by a user, and each condition is determined for each mark image in the above description. However, a part or all of the above conditions may be configured to be set or determined for each mark image. For example, the overwritten condition and the printing stoppage condition are set or determined for a mark image, and all of the conditions are set or determined for other mark images. Furthermore, the order of determination of each printing condition may be configured to be different from that described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer control device comprising:
   a rasterized data generation unit that generates rasterized data for a first printer;
   a setting information obtainment unit that obtains setting information that is related to drawing of a mark image for a second printer in the generated rasterized data;
   a mark drawing unit that draws the mark image for the second printer in the generated rasterized data on the basis of the setting information; and
   a printing control unit that allows the second printer to perform a printing process, using the rasterized data generated for the first printer in which the mark image for the second printer is drawn.

2. The printer control device according to claim 1, wherein the setting information includes information that indicates an extent of overlap between a first area where the mark image for the second printer is expected to be printed and a second area where printing data in the rasterized data exists.

3. The printer control device according to claim 2, wherein the printing control unit stops the printing process in the second printer when the extent of overlap between the first area and the second area is within a range indicated by the setting information.

4. The printer control device according to claim 2, wherein based on printer-dependent information, the second mark image obtained from the second printer is expected to be drawn at a position, and when the extent of overlap between the first area and the second area is within a range indicated by the setting information, the mark drawing unit draws the second mark image in the rasterized data at said position.

5. The printer control device according to claim 2, wherein based on printer-dependent information, the second mark image obtained from the second printer is expected to be drawn at a position, and when the extent of overlap between the first area and the second area is within a range indicated by the setting information, the mark drawing unit draws the second mark image in the rasterized data at a position displaced from said position.

6. The printer control device according to claim 5, wherein the mark drawing unit draws the second mark image at a position that does not overlap with the second area.

7. The printer control device according to claim 2, wherein the printing control unit allows the second printer to perform the printing process, using the rasterized data for the first printer when the extent of overlap between the first area and the second area is within a range indicated by the setting information.

8. The printer control device according to claim 1, wherein the first printer is a continuous paper printer that uses a continuous paper as a printing medium or is a cut paper printer that uses a cut paper as the printing medium, and
   the second printer is the cut paper printer or the continuous paper printer.

9. A non-transitory computer readable medium storing a program causing a computer to execute a process for controlling printers, the process comprising:
   generating rasterized data for a first printer;
   obtaining setting information that is related to drawing of a mark image for a second printer in the generated rasterized data;
   drawing the mark image for the second printer in the generated rasterized data on the basis of the setting information; and
   performing a printing process with the second printer, using the rasterized data generated for the first printer in which the mark image for the second printer is drawn.

* * * * *